United States Patent
Chen

(10) Patent No.: US 9,313,400 B2
(45) Date of Patent: Apr. 12, 2016

(54) LINKING-UP PHOTOGRAPHING SYSTEM AND CONTROL METHOD FOR LINKED-UP CAMERAS THEREOF

(71) Applicant: VIVOTEK INC., New Taipei (TW)

(72) Inventor: Chih-Chiang Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 323 days.

(21) Appl. No.: 14/056,515

(22) Filed: Oct. 17, 2013

(65) Prior Publication Data
US 2014/0104376 A1 Apr. 17, 2014

(30) Foreign Application Priority Data

Oct. 17, 2012 (TW) .............................. 101138328 A
Jun. 14, 2013 (TW) .............................. 102121251 A

(51) Int. Cl.
*H04N 7/18* (2006.01)
*H04N 5/232* (2006.01)
*G08B 13/196* (2006.01)

(52) U.S. Cl.
CPC ...... *H04N 5/23238* (2013.01); *G08B 13/19643* (2013.01); *G08B 13/19689* (2013.01); *H04N 7/18* (2013.01); *H04N 7/181* (2013.01)

(58) Field of Classification Search
CPC ................. H04N 5/23238; H04N 7/18; G08B 13/19643; G08B 13/19689
USPC ..................................................... 348/36, 47
See application file for complete search history.

(56) References Cited

U.S. PATENT DOCUMENTS

| | | | | |
|---|---|---|---|---|
| 7,715,656 B2 * | 5/2010 | Zhou | ..................... | G06T 3/0018 345/650 |
| 2002/0075258 A1 | 6/2002 | Park et al. | | |
| 2005/0231589 A1 | 10/2005 | Chiang | | |
| 2006/0104541 A1 * | 5/2006 | Baker | ................... | G06T 3/4038 382/284 |
| 2006/0227041 A1 * | 10/2006 | Okamoto | ................ | G06T 7/002 342/174 |
| 2010/0239172 A1 * | 9/2010 | Akiyama | .............. | G06T 7/0028 382/190 |
| 2012/0169882 A1 * | 7/2012 | Millar | .................... | H04N 7/181 348/159 |

FOREIGN PATENT DOCUMENTS

WO 2005024720 A2 3/2005

OTHER PUBLICATIONS

European Patent Office ,"Office Action", Sep. 16, 2015, Germany.

* cited by examiner

*Primary Examiner* — William C Vaughn, Jr.
*Assistant Examiner* — Jae N Noh
(74) *Attorney, Agent, or Firm* — Locke Lord LLP; Tim Tingkang Xia, Esq.

(57) ABSTRACT

The disclosure relates to a linking-up photographing system and a control method of linked-up cameras thereof including the following steps. A first image is acquired via a first camera. A second image is acquired via a second camera and presents a field of view (FOV) which partially overlaps a FOV of the first image at least. A control look-up table is established according to the first image and the second image. A designating command specifying a region of interest (ROI) in the first image is received. A FOV of the second camera is adjusted according to the ROI and the control look-up table, and then the second camera photographs a view specified by the ROI, so as to obtain a third image. In this way, the second camera can link up and cooperate with the first camera easily.

14 Claims, 19 Drawing Sheets

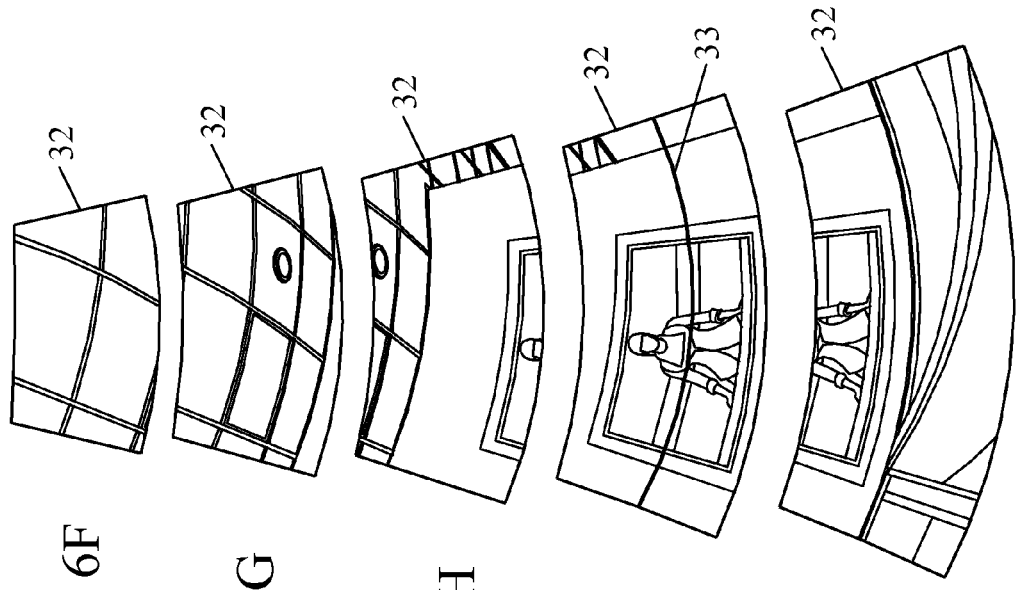
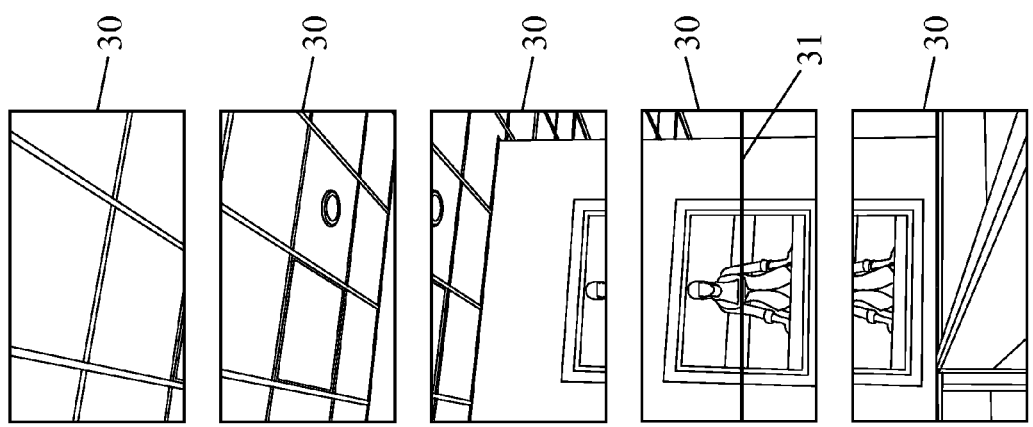

LINKING-UP PHOTOGRAPHING SYSTEM AND CONTROL METHOD FOR LINKED-UP CAMERAS THEREOF

CROSS-REFERENCE TO RELATED APPLICATIONS

This non-provisional application claims priority under 35 U.S.C. §119(a) on Patent Application No(s). 101138328 filed in Taiwan, R.O.C. on Oct. 17, 2013, and on Patent Application No(s). 102121251 filed in Taiwan, R.O.C. on Jun. 14, 2013, the entire contents of which are hereby incorporated by reference.

TECHNICAL FIELD

The disclosure relates to a linking-up photographing system and a control method for linked-up cameras thereof, more particularly to a linking-up photographing system and a control method for linked-up cameras thereof which are capable of fast linking up linked-up cameras which cooperate with each other.

BACKGROUND

Recently more and more surveillance systems are popularly being used for protecting people's wealth and security. A panoramic camera was invented so that a surveillance system could monitor environments without any dead angles. The panoramic camera can be embodied by a multi-lenses assembly, or by a single fisheye lens. The panoramic camera supports the wide-angle photographing without any dead angles.

However, the panoramic camera cannot support an optical zoom, so an observer can not zoom in on an object under observation in a panoramic image captured by the panoramic camera. Even though the panoramic camera supports a digital zoom to enlarge its panoramic image for observing an object under observation in the enlarged panoramic image, the panoramic camera can not fulfill the actual requirements yet. Because this digital zoom is accomplished by cropping an image down to a centered area with the same aspect ratio as the original, and usually also interpolating the result back up to the pixel dimensions of the original, the resolution of the enlarged panoramic image will greatly reduce. If there is an accident that happened far away from the panoramic camera, it will be difficult for an observer to clearly observe the object under observation in the obtained panoramic image.

As compared with the panoramic camera, a pan-tilt-zoom (PTZ) camera can support the optical zoom so that it can zoom in to change its field of view (FOV), so as to zoom in on a remote object under observation. The FOV of the PTZ camera is smaller than the FOV of the panoramic camera. Thus, the PTZ camera is applied to cooperate with the panoramic camera in order to capture the details of the same view.

The angles of view of cameras disposed in different locations may be not the same, so when the PTZ camera is driven according to what the panoramic camera focuses on in the same environment, the FOV of the panoramic camera and the FOV of the PTZ camera will have differences therebetween. Therefore, the panoramic camera and the PTZ camera in such a surveillance system have to be disposed as close to each other as possible.

SUMMARY

A control method for linked-up cameras according to an embodiment of the disclosure includes the following steps. A first image is acquired via a first camera, and a second image is acquired via a second camera. A field of view (FOV) of the first image partially overlaps a FOV of the second image at least. A control look-up table is established according to the first image and the second image. A designating command specifying a region of interest (ROI) in the first image is received. According to the ROI and the control look-up table, a FOV of the second camera is adjusted for the second camera to photograph a view specified by the ROI, to obtain a third image.

A linking-up photographing system according to an embodiment of the disclosure includes a first camera configured to acquire a first image, a second camera configured to acquire a second image, a calibration unit configured to establish a control look-up table according to the first image and the second image, and a control unit. A FOV of the second image partially overlaps a FOV of the first image at least. The control unit is configured to receive a designating command which specifies a ROI in the first image, and to adjust a FOV of the second camera according to the ROI and the control look-up table, so as to control the second camera to photograph a view specified by the ROI, to obtain a third image.

A control method of linked-up cameras according to an embodiment of the disclosure includes the following steps: acquiring a first image via a first camera; acquiring a second image via a second camera, wherein a FOV of the second image partially at least overlaps a FOV of the first image; setting M position points in the first image and in the second image, and the M position points of the first image corresponding to the M position points of the second image respectively, where M is a positive integer greater than or equal to 3; receiving a designating command which specifies a ROI in the first image; calculating a coordinate transformation parameter set according to at least three selected position points; calculating a mapping point of the second image corresponding to a center point of the ROI according to the coordinate transformation parameter set; and adjusting a FOV of the second camera according to the mapping point, and then controlling the second camera to photograph a view specified by the ROI, to obtain a third image.

A linking-up photographing system according to an embodiment of the disclosure includes a first camera configured to acquire a first image; a second camera configured to acquire a second image presenting a FOV which partially overlaps a FOV of the first image at least; and a control module configured to set M position points in the first image and in the second image, to receive a designating command which specifies a ROI in the first image, to calculate a coordinate transformation parameter set according to at least three selected position points, to calculate a mapping point of the second image corresponding to a center point of the ROI according to the coordinate transformation parameter set, and to adjust a FOV of the second camera according to the mapping point, so as to control the second camera to photograph a view specified by the ROI, to obtain a third image, where the M position points of the first image corresponding to the M position points of the second image respectively, and M is a positive integer greater than or equal to 3.

BRIEF DESCRIPTION OF THE DRAWINGS

The present invention will become more fully understood from the detailed description given hereinbelow along with the accompanying drawings which are for illustration only, thus are not limitative of the present invention, and wherein:

FIG. 6A to FIG. 6K are schematic diagrams for showing the panoramic stitching of the fourth images according to an embodiment of the disclosure;

DETAILED DESCRIPTION

Figure 1:
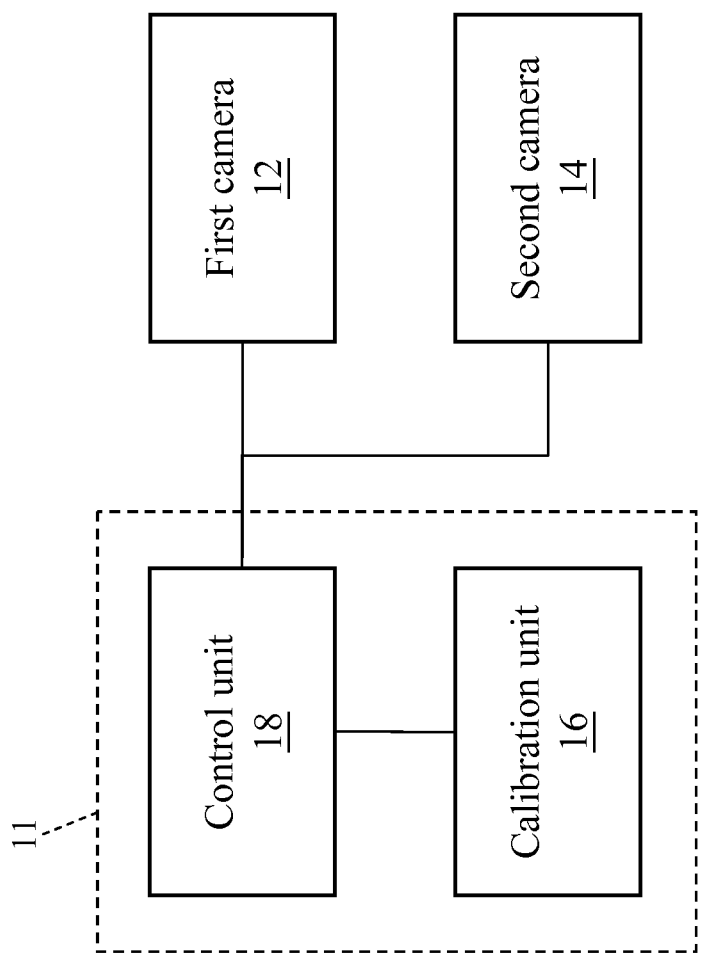
FIG. 1 is a schematic diagram of a linking-up photographing system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates a linking-up photographing system according to an embodiment of the disclosure. The linking-up photographing system includes a first camera 12, a second camera 14 and a control module 11 which includes a calibration unit 16 and a control unit 18. The first camera 12, the second camera 14 and the calibration unit 16 respectively connect to the control unit 18. The first camera 12 and the second camera 14 respectively capture images according to their FOVs, so the control unit 18 can acquire a first image via the first camera 12 and a second image via the second camera 14. A FOV of the first image partially overlaps a FOV of the second image at least.

For example, the first camera 12 and the second camera 14 are lens sets with charge-coupled devices (CCDs), lens sets with complementary metal-oxide-semiconductors (CMOSs) or internet protocol (IP) cameras. Specifically, the first camera 12 can be, for example, a fisheye camera, a panoramic camera or a wide-angle camera. The disclosure takes a fisheye camera as an example as the first camera 12, so the first image is a panoramic image, i.e. a fisheye image. Generally, a panoramic image can present a FOV of 360 degrees. For instance, the second camera 14 is a pan-tilt-zoom (PTZ) camera or a digital PTZ camera, and can perform an optical zoom or a digital zoom.

Figure 2B:
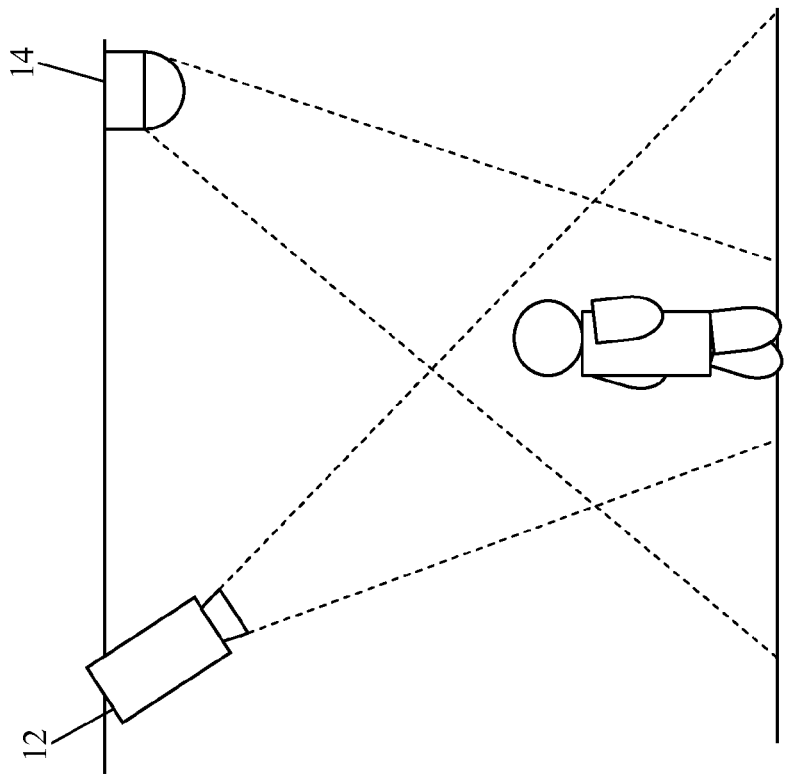
FIG. 2B is a schematic disposition diagram of a first camera and a second camera in FIG. 1 according to another embodiment of the disclosure.
Figure 2A:
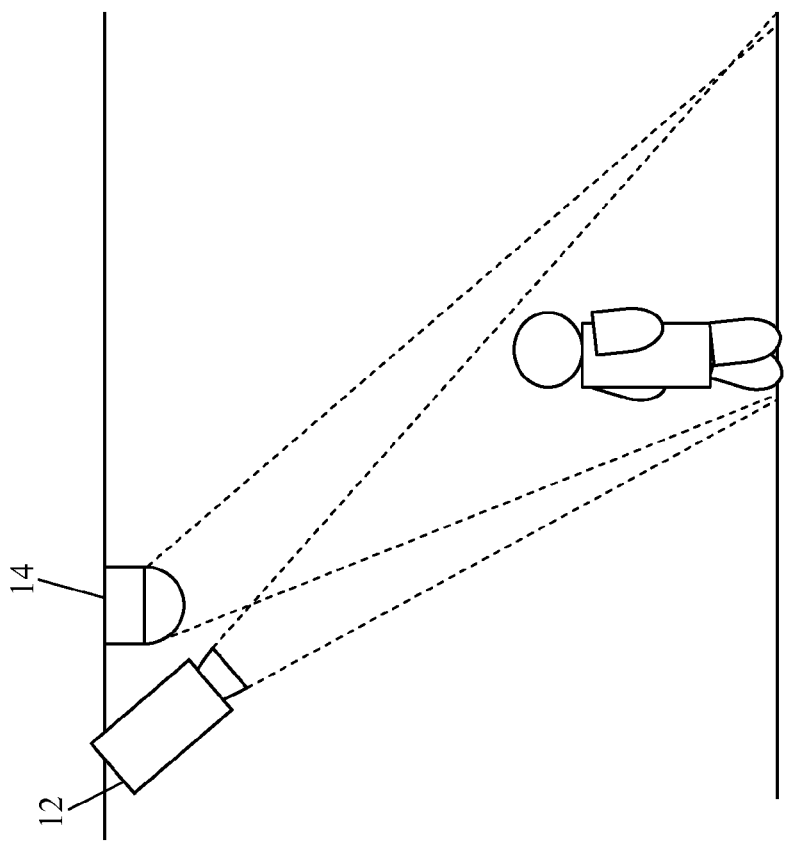
FIG. 2A is a schematic disposition diagram of a first camera and a second camera in FIG. 1 according to an embodiment of the disclosure.

The location of the first camera 12 and the location of the second camera 14 are adjacent to each other in an exemplary embodiment, or have a preset distance therebetween in another exemplary embodiment. For instance, the location of the first camera 12 and the location of the second camera 14 are close to each other in the same room as shown in FIG. 2A, or are disposed apart from each other in the same room as shown in FIG. 2B.

The calibration unit 16 and the control unit 18 in this and some embodiments can be embodied by a personal computer, a network video recorder (NVRs), an embedded system, or other electronic devices with a computing function. In this and some embodiments, the calibration unit 16 and the control unit 18 can be disposed in the same computer or server and connect to the first camera 12 and the second camera 14 through a network.

Figure 3:
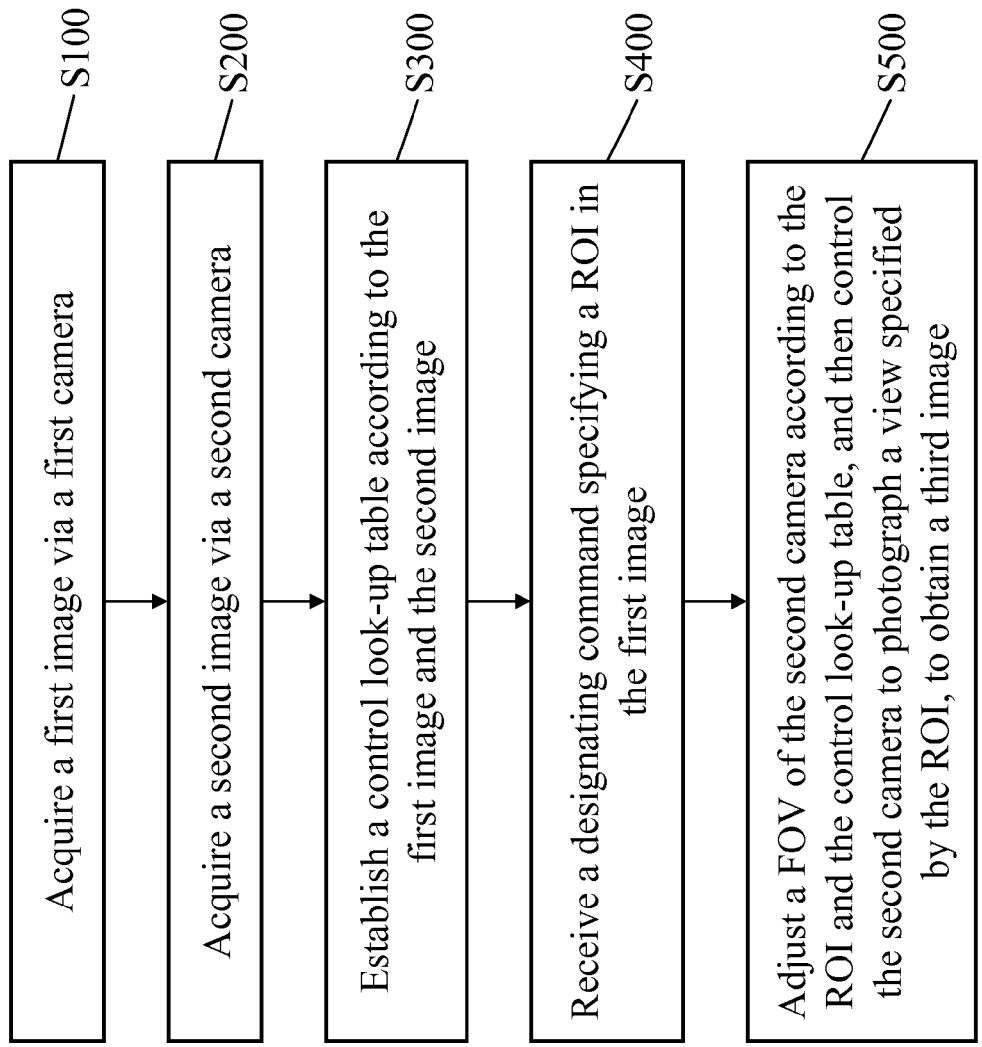
FIG. 3 is a flowchart of a control method of linked-up cameras according to an embodiment of the disclosure.

The link-up control procedure performed by the linking-up photographing system is described as follows. FIG. 3 illustrates a control method of linked-up cameras according to an embodiment of the disclosure. Through the control method of linked-up cameras, the linking-up photographing system controls the second camera to pan, tilt or zoom in or out according to the sensed result of the first camera and/or a designating command, for capturing a third image. In this and some embodiments, the designating command can be provided manually by observers or be provided automatically by performing a motion detection procedure or an object detection procedure, or be provided by an external computing device.

Figure 4B:
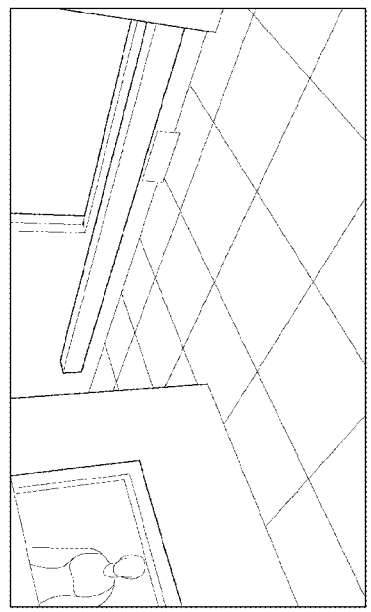
FIG. 4B is a schematic diagram of a fourth image according to an embodiment of the disclosure.
Figure 4A:
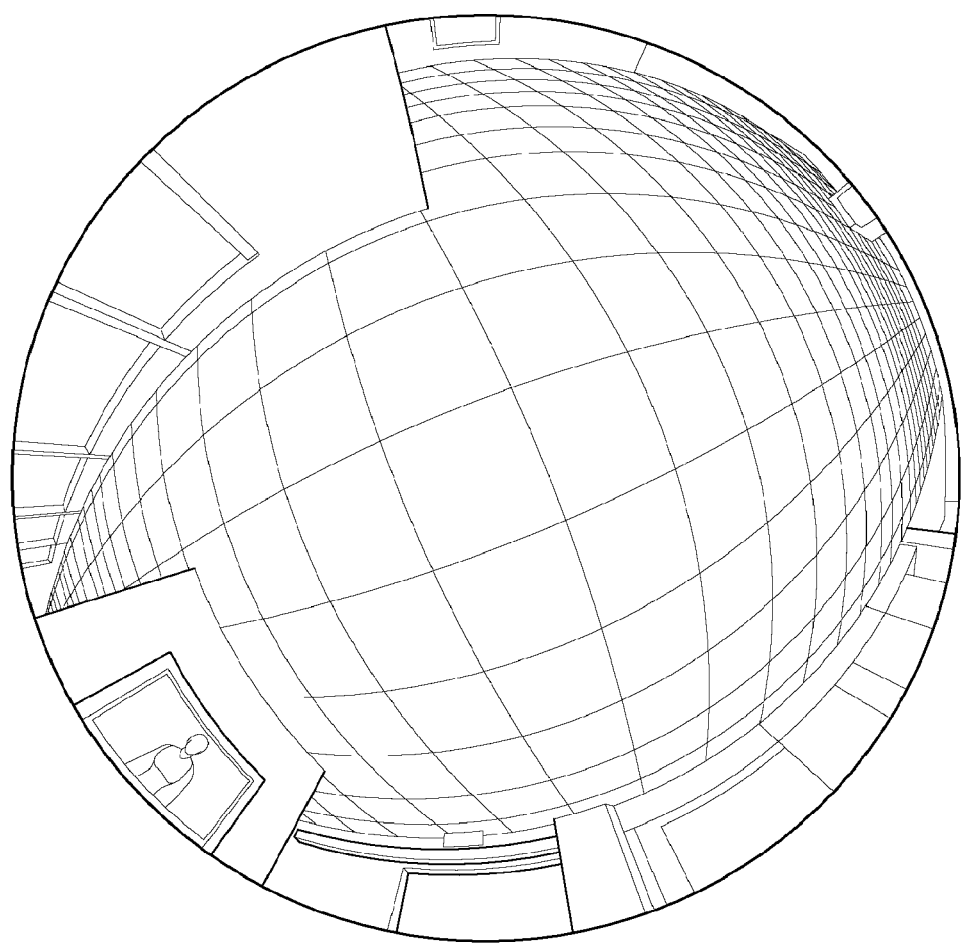
FIG. 4A is a schematic diagram of a first image according to an embodiment of the disclosure.
Figure 4C:
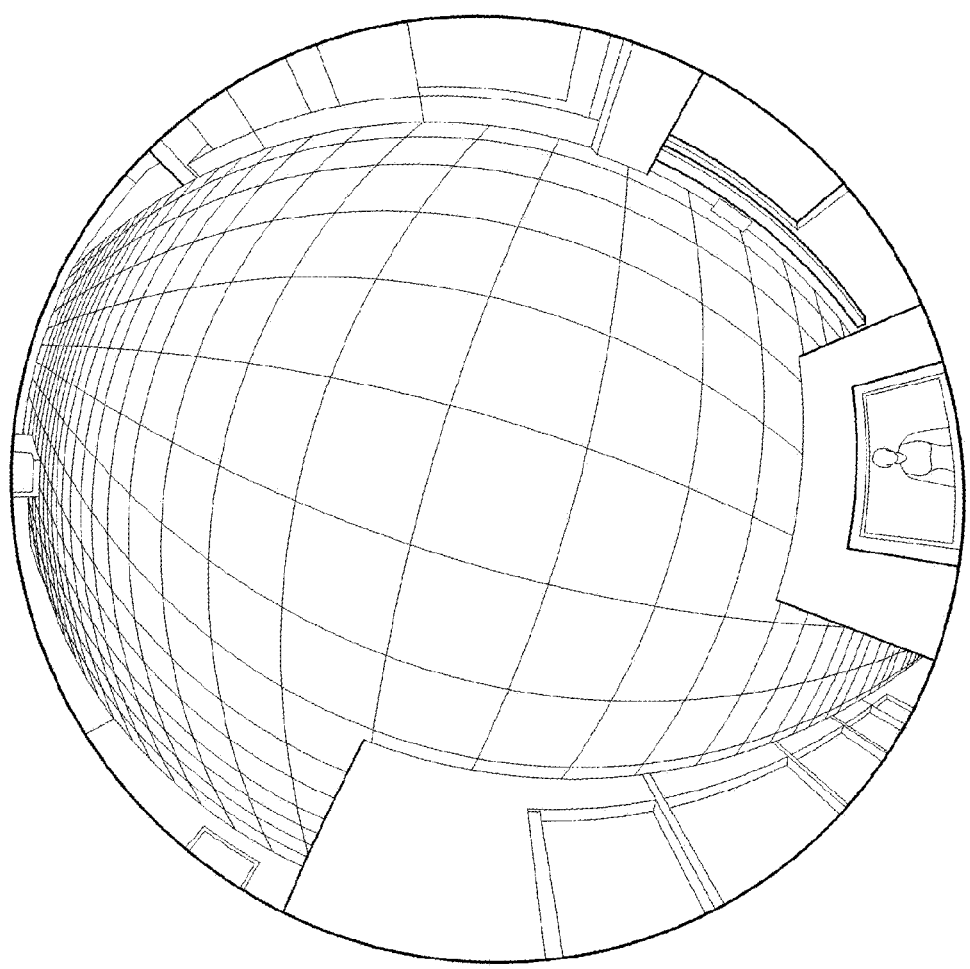
FIG. 4C is a schematic diagram of a second image according to an embodiment of the disclosure.
Figure 5:
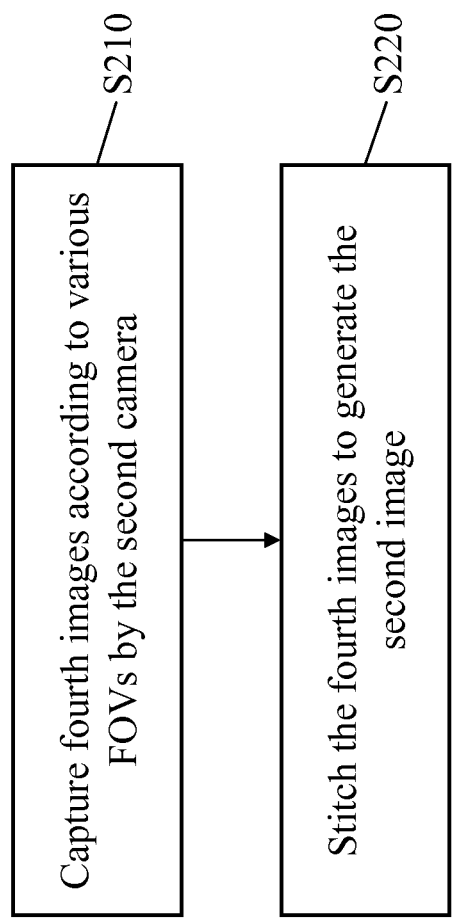
FIG. 5 is a flowchart of the step S200 in FIG. 3 according to an embodiment of the disclosure.

Firstly, a first image as shown in FIG. 4A is acquired via the first camera (step S100), and a second image as shown in FIG. 4C is acquired via the second camera (step S200). A FOV of the second image partially overlaps a FOV of the first image at least. Specifically, refer to FIG. 5, the calibration unit 16 or the control unit 18 in step S200 performs step S210 and S220 to obtain the second image. Firstly, the calibration unit 16 controls the second camera 14 to, according to various FOVs, capture a plurality of fourth images which are planar images as shown in FIG. 4B (step S210). Then, the calibration unit 16 stitches these fourth images to generate a panoramic image which is set as the second image as shown in FIG. 4C (step S220).

The detail of panoramically stitching the fourth images is described as follows. In FIG. 6A to FIG. 6E, many fourth images 30 are respectively captured according to various FOVs, and the FOVs of these fourth images 30 have scenes adjacent to each other. Thus, the contents of some of these fourth images 30 overlap each other. Because the first image 22 is a panoramic image, the fourth images 30 need to be curved to be corresponding fifth images 32 shown in FIG. 6F to FIG. 6J. Specifically, the fourth image 30 in FIG. 6A becomes the fifth image 32 in FIG. 6F, the fourth image 30 in FIG. 6B becomes the fifth image 32 in FIG. 6G, the fourth image 30 in FIG. 6C becomes the fifth image 32 in FIG. 6H, and the rest can be deduced by analogy. Then, the fifth images 32 in FIG. 6F to FIG. 6J are stitched to generate one section 34, shown in FIG. 6K, of a panoramic image according to features of the fifth images 32 during the panoramic stitching, and the features can be specific objects or scenes in the images. In the same way, the second camera 14 can photograph scenes corresponding to other parts of the FOV of the first image, to obtain and process more fourth images for obtaining more sections 34 of the panoramic image. Finally, all sections 34 are further stitched to generate the panoramic image which is set as the second image similar to the first image.

Figure 6K:
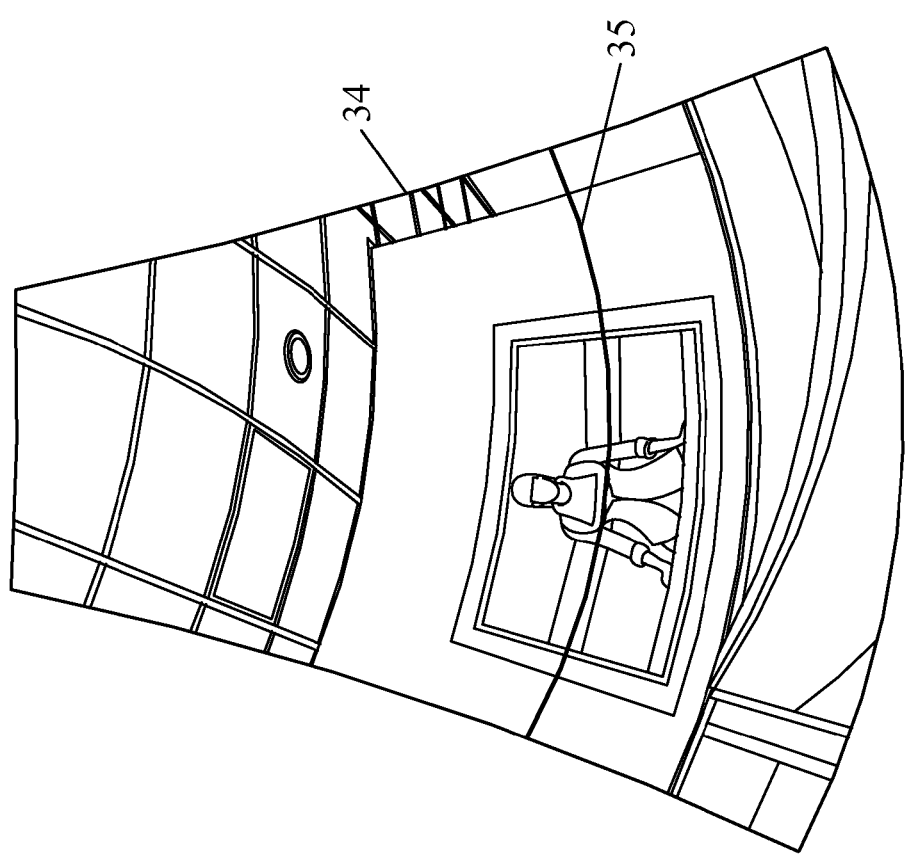

Since the fourth images 30 are curved to be the fifth images 32, the horizontal lines in each fourth image 30 become arcs. For example, a reference axis 31 horizontally across the fourth image 30 in FIG. 6D is straight, and a reference axis 33 in the fifth image 32 is an arc. Thus, the reference axis 35 in the section 34 in FIG. 6K is an arc as the same as the reference axis 33.

Refer to FIG. 3, after receiving the first image and the second image, the calibration unit 16 establishes a control look-up table according to the first image and the second image (step S300). Herein, the calibration unit 16 can directly receive the first image or the fourth images, or receive one of them through the control unit 18. If the control unit 18 outputs the second image, the calibration unit 16 can receive the second image from the control unit 18.

Figure 7:
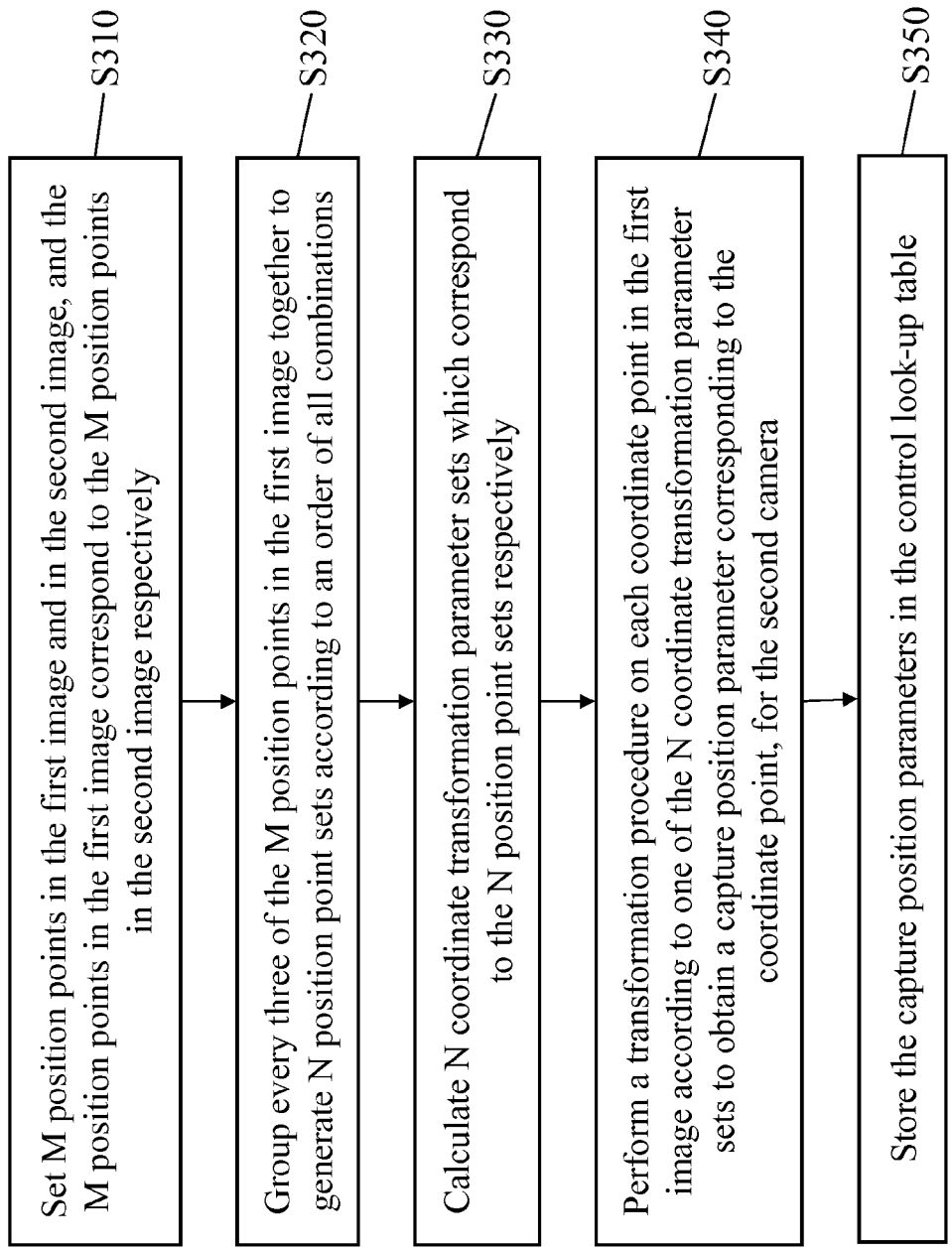
FIG. 7 is a flowchart of the step S300 in FIG. 3 according to an embodiment of the disclosure.
Figure 8:
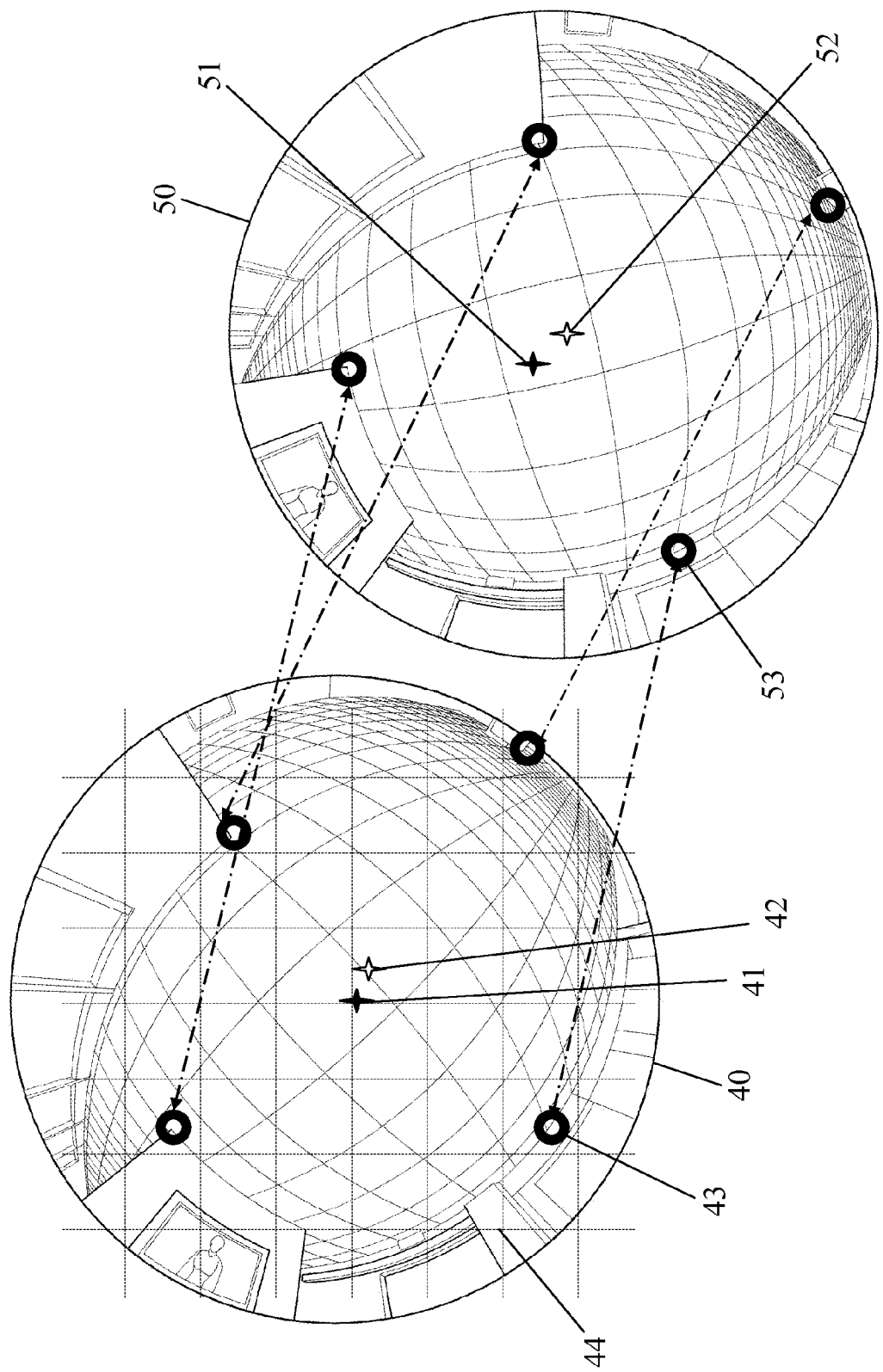
FIG. 8 is a schematic diagram of the selection of position points in the first image and the second image according to an embodiment of the disclosure.

The detail of the establishment of the control look-up table is described as follows. Refer to FIG. 7 and FIG. 8, the above step S300 and the setting of position points in a mapping transformation procedure are illustrated. In FIG. 8, the first image 40 has a first central point 41, and the second image 50 has a second central point 52. The first central point 41 corresponds to a first central mapping point 51 in the second image 50, and the second central point 52 corresponds to a second central mapping point 42 in the first image 40. The first central mapping point 51 can be thought as formed by projecting the first central point 41 on the second image 50, and the second central mapping point 42 can be thought as formed by projecting the second central point 52 on the first image 40.

The first camera 12 and the second camera 14 are disposed at different locations, whereby the FOV of the first image 40, and the FOV of the second image 50 are partially the same. In the second image 50, the location of the first central mapping point 51 differs from the location of the second central point 52, and the distance between the first central mapping point 51 and the second central point 52 increases with the disposition distance of the first camera 12 and the second camera 14 increased. Similarly, in the first image 40, the location of the second central mapping point 42 also differs from the location of the first central point 41.

In FIG. 7, firstly the calibration unit 16 sets M position points 43 in the first image 40, and M corresponding position points 53 in the second image 50, where M is a positive integer greater than or equal to 3 (step S310). For example, M is 50 or 100. The position point 43 and the position point 53 specify the same position in the first image 40 and the second image 50. Because the first camera 12 and the second camera 14 are disposed at different locations, the position of an object in the FOV of the first image 40 and the position of this object in the FOV of the second image 50 are different. For example, a coordinate of a point in an upper right corner of a picture in the first image 40 is (160, 180), and a coordinate of the same point in the second image 50 is (270, 80).

The selection and setting of the position points can be performed manually or be performed by a feature point extraction and matching technology to find out M pairs of the position point 43 of the first image 40 and the position point 53 of the second image 50.

The calibration unit 16 groups every three of the M position points 43 of the first image 40 together to generate N position point sets according to an order of all combinations, where N is a positive integer (step S320). Specifically, N is a number of combinations $C_3^M$ representing that three of the M position points 43 are selected every time. Assume that M is 4. The calibration unit 16 will select the first one, second one and third one of the four position points 43 to be a first position point set, select the first one, second one and fourth one of the four position points 43 to be a second position point set, select the first one, third one and fourth one of the four position points 43 to be a third position point set, and select the second one, third one and fourth one of the four position points 43 to be a fourth position point set. Thus, there will totally be four position point sets ($C_3^4=4$).

Subsequently, the calibration unit 16 calculates N coordinate transformation parameter sets corresponding to the N position point sets respectively (step S330). In other words, the calibration unit 16 performs a mapping transformation procedure on each position point 43 of each of the N position point sets and on each corresponding position point 53 to calculate and obtain a coordinate transformation parameter set. Assume that the locations of the M position points 43 of the first image 40 and the locations of the M position points 53 of the second image 50 are known, the mapping transformation procedure can be performed by the following equation:

$$\begin{bmatrix} X_o \\ Y_o \end{bmatrix} = \begin{bmatrix} a_1 & a_2 & a_3 \\ b_1 & b_2 & b_3 \end{bmatrix} \begin{bmatrix} X_i \\ Y_i \\ 1 \end{bmatrix}, \quad (1)$$

where ($X_i, Y_i$) represents a coordinate of the position point 43 of the first image 40, ($X_o, Y_o$) represents a coordinate of the position point 53 of the second image 50, (a1, a2, a3, b1, b2, b3) represents a coordinate transformation parameter set of a pair of the position points 43 and 53. In this way, the N coordinate transformation parameter sets can be calculated and obtained according to the N position point sets. In the subsequent steps, the control unit 18 can map any point in the first image 40 onto a corresponding point in the second image 50 according to the obtained coordinate transformation parameter sets. In other words, according to the coordinate transformation parameter sets, the control unit 18 can utilize a location of one point in the first image 40 to calculate and obtain a location of a corresponding point in the second image 50.

Subsequently, the calibration unit 16 sets a plurality of coordinate points 44 in the first image 40. In an embodiment, all the pixels in the first image 40 can be set as the coordinate points 44 except the pixels at the position points 43. In another embodiment, some pixels in the first image 40 are sampled and set as coordinate points 44 in order to reduce the computing quantity and time. For instance, one pixel in every 8×8 pixels or every 16×16 pixels is selected and set as one coordinate point 44 as shown in FIG. 8.

The calibration unit 16 performs the mapping transformation procedure on each of the coordinate points 44 in the first image 40 according to one of the N coordinate transformation parameter sets to obtain a capture position parameter corresponding to the coordinate point 44 for the second camera 14

(step S340), and stores the obtained capture position parameter in the control look-up table (step S350). In other words, the calibration unit 16 in step S340 can sequentially select one coordinate point 44 to perform the mapping transformation procedure on the selected coordinate point 44, and then can determine whether all the coordinate points 44 have been selected or not. If some coordinate points 44 have not been selected, the calibration unit 16 can successively select next one of these coordinate points 44 to perform the mapping transformation procedure until all the coordinate point 44 are selected.

Figure 9:
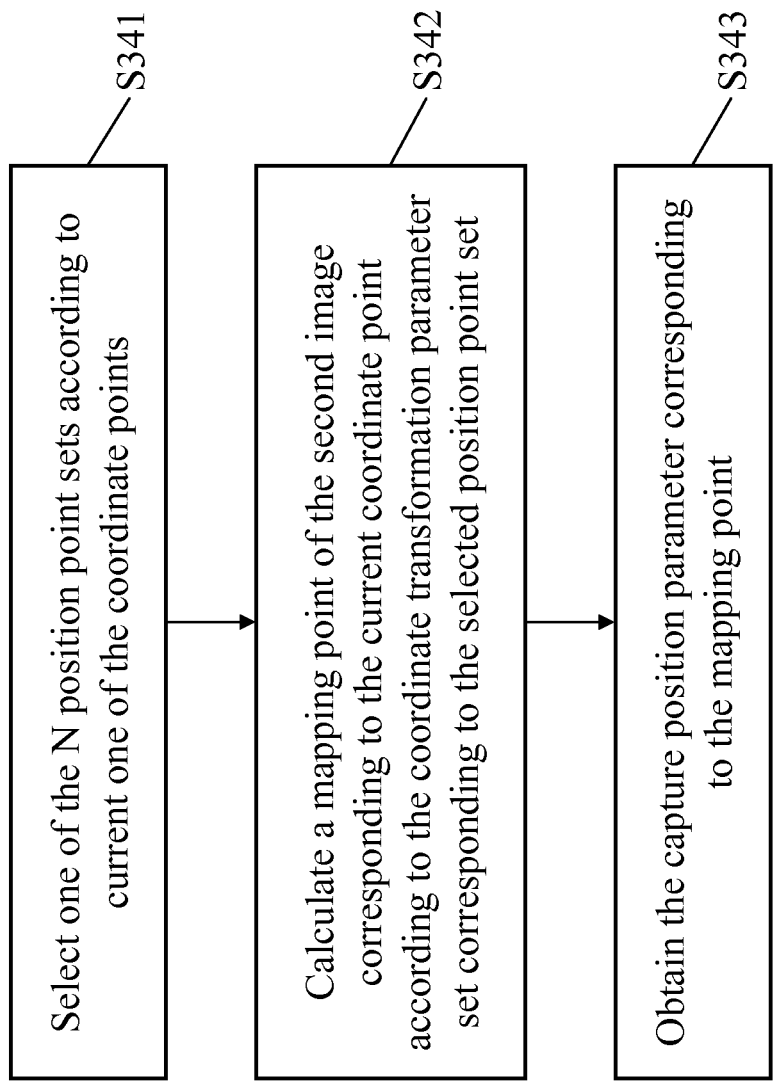
FIG. 9 is a flowchart of the step S340 in FIG. 7 according to an embodiment of the disclosure.

FIG. 9 is a flowchart of the step S340 in FIG. 7 according to an embodiment of the disclosure. One of the N position point sets in the first image 40 is selected according to current one of the coordinate points 44 (step S341). Specifically, the selected position point set has three position points 43 which are the closest to the current coordinate point 44 in the first image 40. The calibration unit 16 sums up a distance between the current coordinate point 44 and each of the three position points 43, and then selects the position point set corresponding to the minimum sum total.

Then, the mapping point of the second image 50 corresponding to the current coordinate point 44 is calculated according to the coordinate transformation parameter set corresponding to the selected position point set (step S342), and the capture position parameter corresponding to the mapping point is obtained (step S343). The coordinate transformation parameter set can be expressed as a transformation matrix as in equation (1), and the calibration unit 16 can multiply the coordinate of the current coordinate point 44 by the transformation matrix to obtain a coordinate of the corresponding mapping point.

Figure 10:
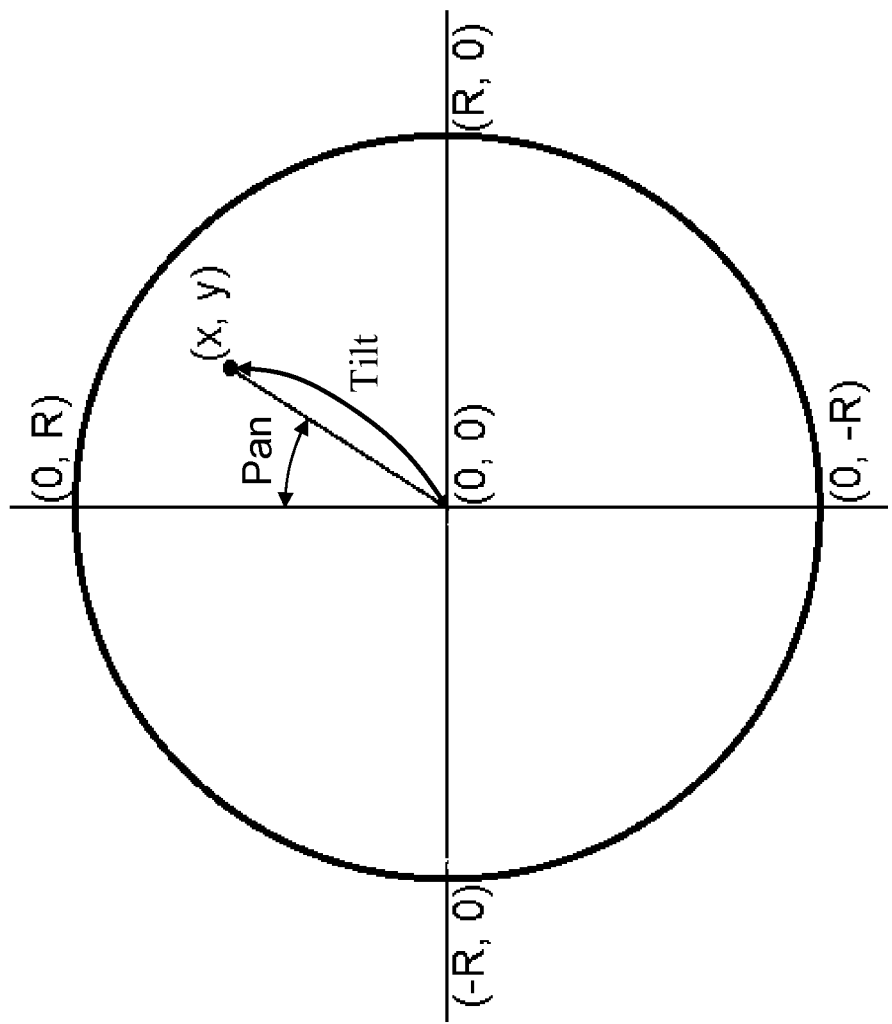
FIG. 10 is a schematic diagram of a relation between a Cartesian coordinate system and a round coordinate system according to an embodiment of the disclosure.

For example, the coordinate of the coordinate point 44 and the coordinate of the mapping point can be expressed by a rectangular coordinate (x, y) in the Cartesian coordinate system or by a round coordinate (pan, tilt) in the Polar coordinate system. Assume that the disclosure takes the round coordinate manner as an exemplary embodiment, the capture position parameter includes a tilt coefficient and a pan coefficient for the second camera 14, and the tilt coefficient and the pan coefficient respectively correspond to a pan angle and a tilt angle which belong to the mapping point. The rectangular coordinate and the round coordinate can be defined as shown in FIG. 10. The rectangular coordinate and the round coordinate can be transformed to each other by using trigonometric functions. For example, the rectangular coordinate (x, y) is transformed to the round coordinate (pan, tilt) by the following equations:

$$\text{pan} = \tan^{-1}\frac{x}{y}; \qquad (2)$$

$$\text{tilt} = \frac{90° \times \sqrt{x^2 + y^2}}{R}. \qquad (3)$$

In a nutshell, the calibration unit 16 in the step S340 calculates the mapping points which respectively correspond to the coordinate points 44, sets the round coordinate of the mapping points to be capture position parameters, and stores the capture position parameters in the control look-up table. Through the control look-up table, the control unit 18 can look up a mapping point, corresponding to each coordinate point 44, in the second image 50 much faster.

In the control method, the steps S100 to S300 are for calibration, and the steps S400 and S500 are performed to control the second camera 14 according to the designating command and the control look-up table in real time. The control unit 18 repeats the steps S400 and S500 to respond every designating command. Refer to FIG. 3, after the control look-up table is established, the control unit 18 can unceasingly determine whether any designating command is provided by a user, and the designating command in this and some embodiments specifies the ROI in the first image. If a designating command is provided, the control unit 18 receives the designating command (step S400). In an exemplary embodiment, the linking-up photographing system supports a graphical user interface (GUI) which allows users to intuitively input designating commands into it. The ROI in this and some embodiments can be circular, so that users can use a fixed circle figure to set the ROI. The GUI also allows users to set the location of the center of circle of the ROI and set the radius of the ROI. Moreover, the shape of the ROI can be a rectangle, a rectangle with round-corners, or an ellipse, but does not limit the disclosure.

Then, the FOV of the second camera 14 is adjusted according to the ROI and the control look-up table, and then the control unit 18 controls the second camera 14 to acquire a third image corresponding to the ROI (step S500). The control unit 18 utilizes the tilt coefficient and the pan coefficient to control the second camera 14, and then the second camera 14 turns to a defined angle according to the tilt coefficient and the pan coefficient to obtain the third image under the FOV corresponding to the two coefficients.

Figure 11:
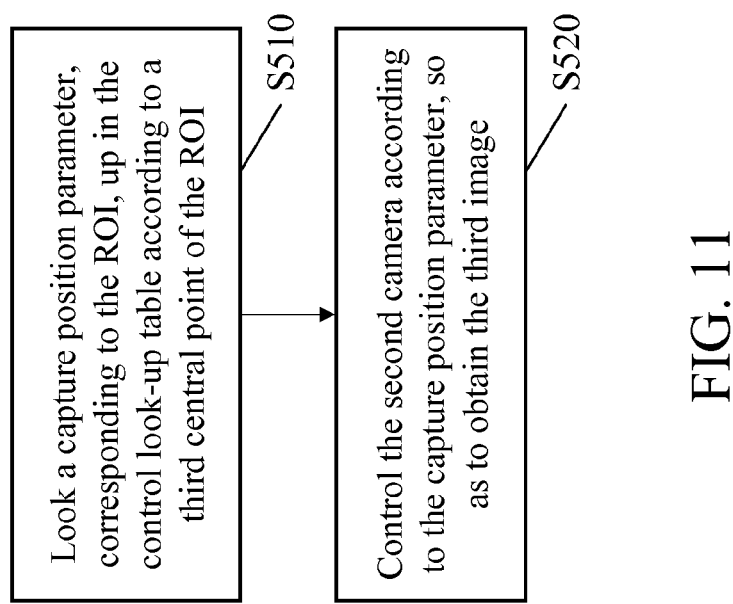
FIG. 11 is a flowchart of the step S500 in FIG. 3 according to an embodiment of the disclosure.

FIG. 11 illustrates the step S500 according to an embodiment of the disclosure. Firstly, the control unit 18 looks up a capture position parameter corresponding to the ROI in the control look-up table according to a third central point of the ROI (step S510), and then controls the second camera 14 to capture a view according to the capture position parameter, so as to obtain the third image (step S520). If the ROI is circular, the third central point is set as a center of this circle. If the third central point is located at one coordinate point 44, the control unit 18 can look up a capture position parameter, e.g. a tilt coefficient and a pan coefficient, corresponding to this coordinate point 44 in the control look-up table. If the third central point is not located at any coordinate point 44, the control unit 18 can look up the coordinate point 44 adjacent to the third central point in the control look-up table, and then calculate the capture position parameter corresponding to the third central point, by using an interpolation method.

Figure 12:
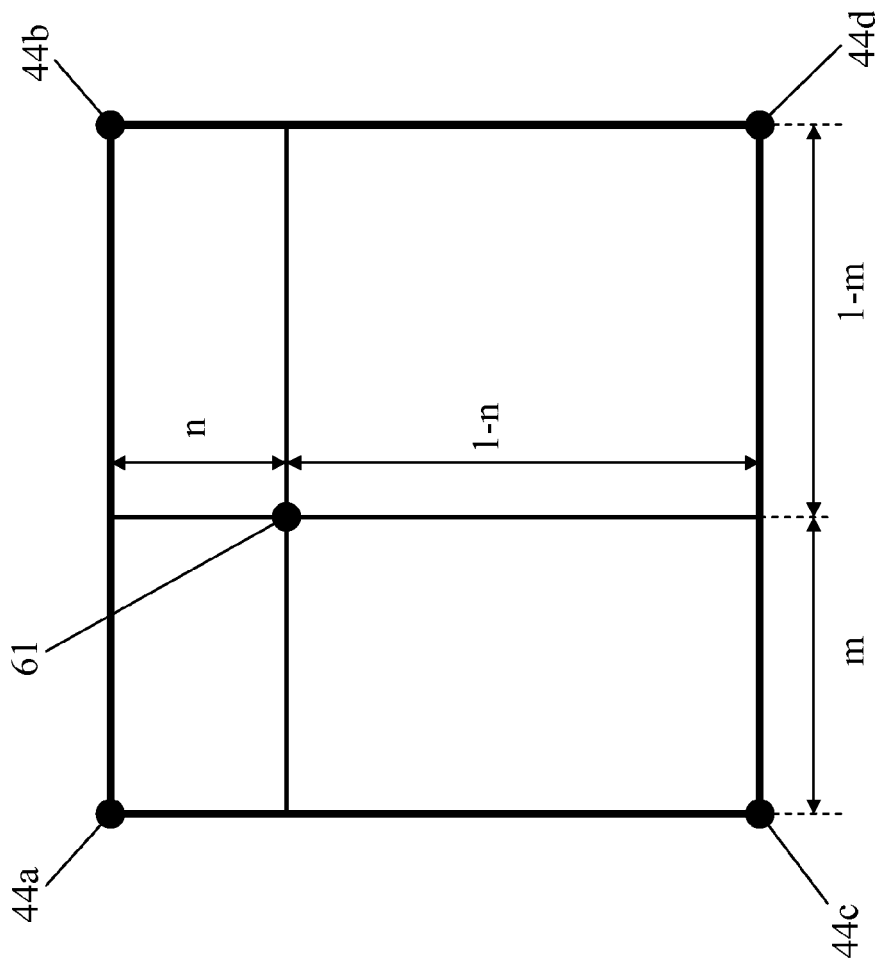
FIG. 12 is a schematic diagram of an interpolation method according to an embodiment of the disclosure.

FIG. 12 illustrates the interpolation method according to an embodiment of the disclosure. Assume that the third central point 61 is located in between four adjacent coordinate points 44a, 44b, 44c and 44d, a distance between two adjacent coordinate points 44, e.g. the coordinate point 44a and the coordinate point 44b, is one unit, a distance between the third central point 61 and the coordinate point 44a on the traverse is m, and a distance between the third central point 61 and the coordinate point 44a on the longitudinal axis is n, where m and n are positive integers less than 1. In this way, the capture position parameter of the third central point 61 can be obtained through the interpolation method by using the following equation:

$$P=[A\times(1-m)+B\times m]\times(1-n)+[C\times(1-m)+D\times m]\times n \qquad (4);$$

where P is the capture position parameter of the third central point 61, e.g. a tilt coefficient and a pan coefficient, and A, B, C and D are capture position parameters of the coordinate points 44a, 44b, 44c and 44d. P, A, B, C and D can be expressed as number pairs, e.g. (pan, tilt).

The control unit 18 looks up the tilt coefficients and pan coefficients of the coordinate points 44a to 44d, and then calculates the corresponding tilt coefficient and pan coefficient of the third central point 61 by the interpolation method. In this way, the control unit 18 can control the second camera 14 to turn to a defined angle corresponding to the tilt coefficient and the pan coefficient, according to the location of the third central point, so as to obtain the third image under the FOV based on the defined angle.

In some embodiments, the second camera 14 can perform an optical zoom or a digital zoom according to the size of the ROI. In other words, a scaling parameter of the second camera 14 is changed according to the ROI. Thus, the capture position parameter further includes a scaling angle specifying the scaling parameter which can be a zoom ratio, a focus value or a view angle for capturing images. The zoom ratio is the relative ratio between the longest and the shortest zoom focal length of the camera lens module, and the focus value or the view angle can be absolute values and be designed and controlled according to different lens sets.

Figure 13A:
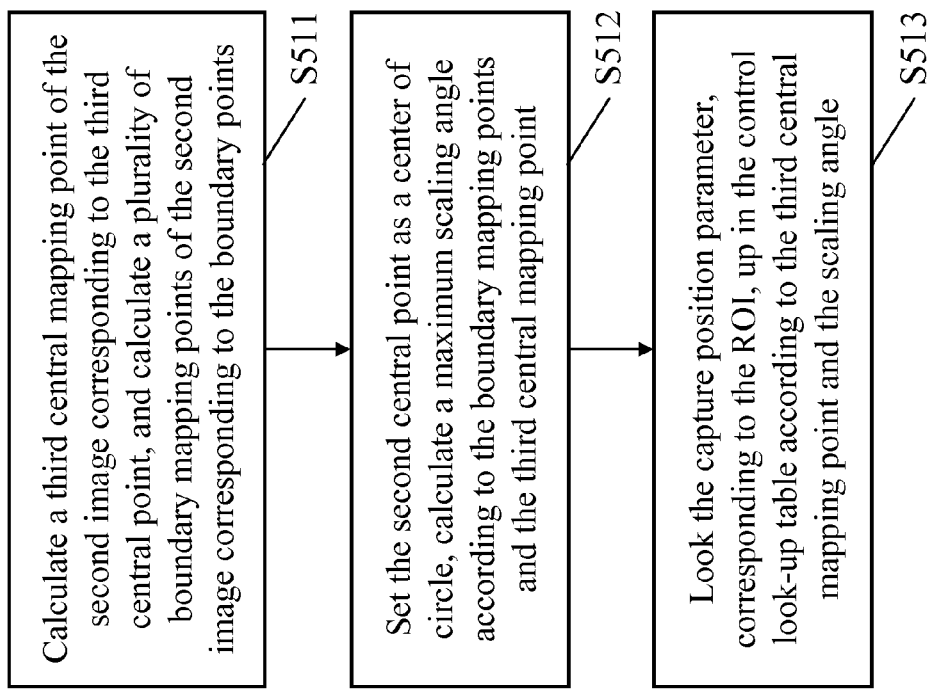
FIG. 13A is a flowchart of the step S510 in FIG. 12 according to an embodiment of the disclosure.
Figure 14:
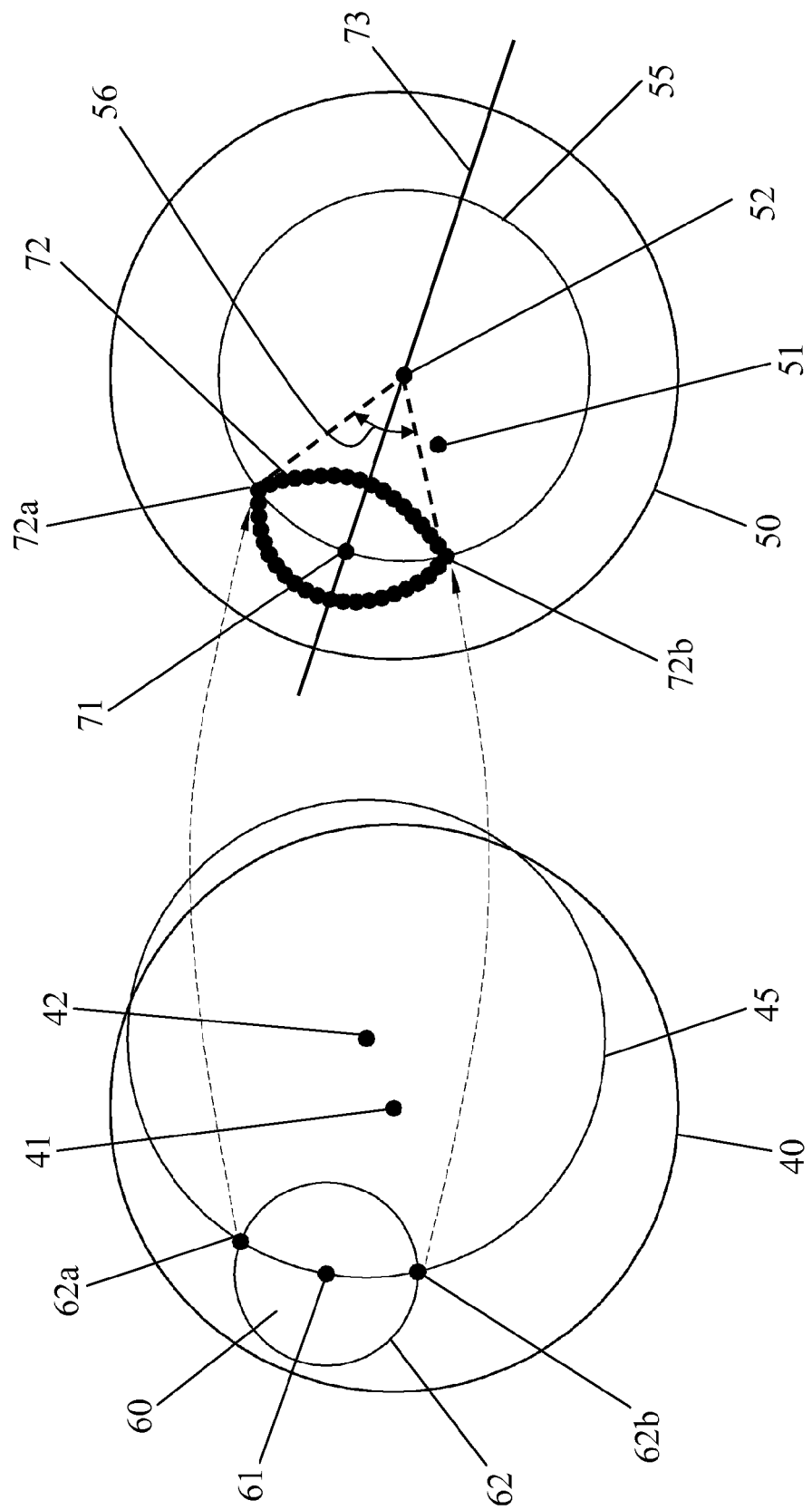
FIG. 14 is a schematic diagram of the setting of boundary mapping points according to an embodiment of the disclosure.

Refer to FIG. 13A and FIG. 14, the detail of the step S510 and the boundary mapping points are illustrated. In this embodiment, the ROI 60 is circular and includes a third central point 61 and a plurality of boundary points 62. The boundary points 62 surround the ROI 60 to form a boundary. The third central point 61 corresponds to a third central mapping point 71 of a second image 50, and the boundary points 62 correspond to a plurality of boundary mapping points 72 of the second image 50 respectively.

The control unit 18 calculates the third central mapping point 71 of the second image 50 corresponding to the third central point 61, and the boundary mapping points 72 of the second image 50 corresponding to the boundary points 62 respectively (step S511). The coordinate of the third central mapping point 71 and the coordinate of the boundary mapping points 72 can be obtained fast by using the above mapping procedure and the above control look-up table or by using the above control look-up table and the above interpolation method.

Line 73 contains the second central point 52 and the third central mapping point 71. The control unit 18 checks every acute angle formed by every mapping point 72 located at one side of line 73, the second central point 52, and the third central mapping point 71, and selects the corresponding mapping point 72 to the maximum acute angle as 72a. The control unit 18 checks every acute angle formed by every mapping point 72 located at the other side of line 73, the second central point 52, and the third central mapping point 71, and selects the corresponding mapping point 72 to the maximum acute angle as 72b. The control unit 18 selects a maximum one of angles formed by the boundary mapping point 72a, the second central point 52 and the third central mapping point 71 or by the boundary mapping point 72b, the second central point 52 and the third central mapping point 71, and multiplies the selected maximum angle by 2 to obtain a scaling angle 56 (step S512).

The scaling angle 56 is not directly formed by the boundary mapping point 72a, the second central point 52 and the boundary mapping point 72b but by multiplying the maximum acute angle by 2. The graph formed by these boundary mapping points 72 which are looked up in the control look-up table according to the boundary points 62, is asymmetrical as compared with line 73. This causes that the FOV corresponding to a scaling angle which is directly formed by the boundary mapping point 72a, the second central point 52 and the boundary mapping point 72b, can not fully cover the boundary mapping points 72a and 72b. Therefore, when the maximum angle is multiplied by 2 to obtain the scaling angle and when a central point of the third image is the third central mapping point 71, i.e. the third central point 61, the left side and right side of the third image will cover the boundary mapping point 72a, i.e. the boundary point 62a, and the boundary mapping point 72b, i.e. the boundary point 62b. The scaling angle 56 herein is rather calculated and obtained according to the ROI 60 in real time than looked up in the control look-up table.

Then, the control unit 18 looks up the capture position parameter corresponding to the ROI 60 in the control look-up table according to the third central mapping point 71 (step S513). The capture position parameter includes a tilt coefficient and a pan coefficient.

The horizontal lines in the fourth images 60 are curved to be arcs, e.g. the reference axis 33 in FIG. 6I. All the reference axes at the same horizontal attitude of the fourth images 60 which are captured according to the same tilt coefficient and various pan coefficients will be curved and form a circle in the second image 50. For example, a second reference circle 55 is shown in FIG. 14 and FIG. 15.

Figure 15:
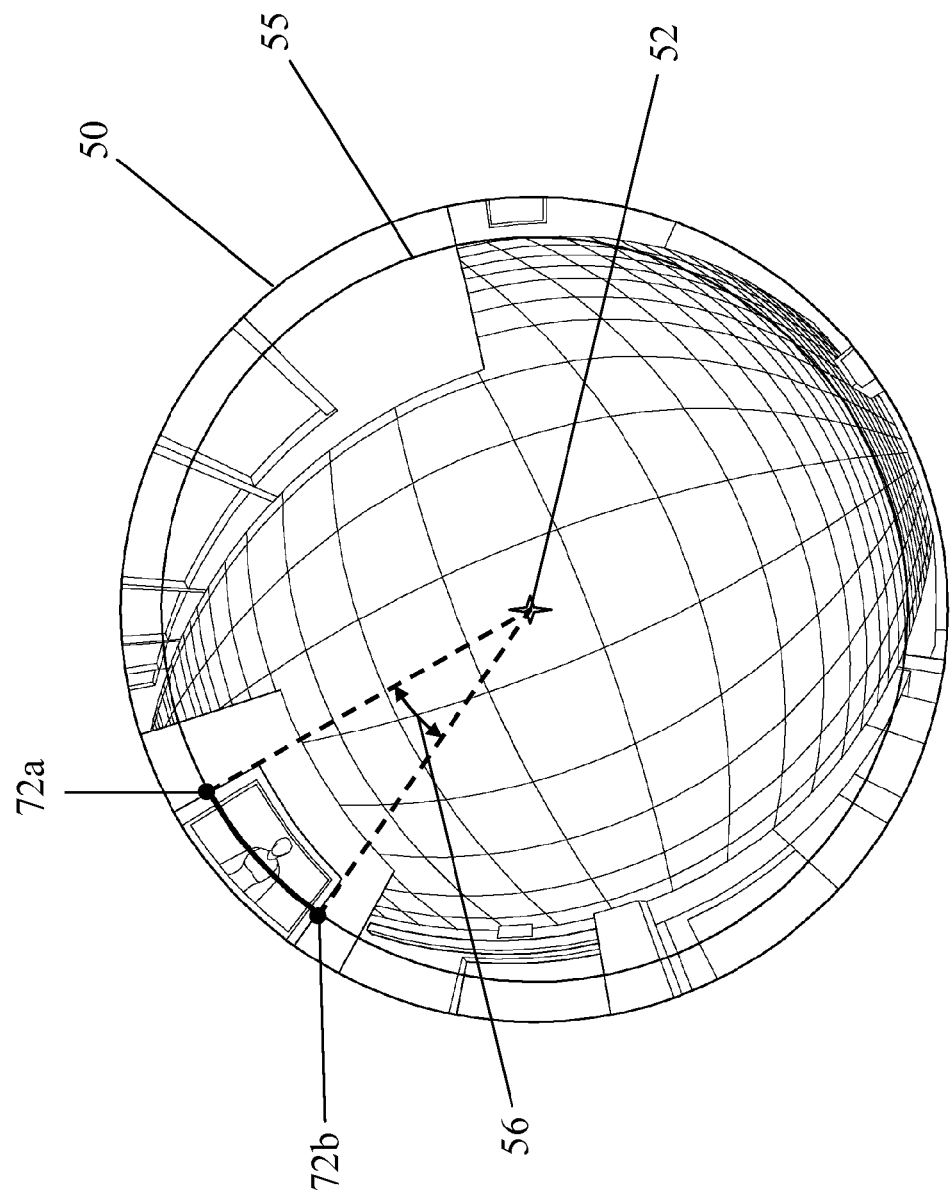
FIG. 15 is a schematic diagram of a second reference circle an embodiment of the disclosure.

The greater the ROI 60 in FIG. 14 is, the greater the distance between the boundary mapping points 72a and 72b, and the scaling angle 56 in FIG. 15 are. This means that the ROI 60 presents a wider FOV. Herein, the second camera 14 can reduce its scaling parameter to obtain a wider FOV, or can increase its scaling parameter to obtain a narrower FOV to obtain more detailed information about remote objects. Thus, the scaling angle 56 can represent a scaling parameter for capturing the third image.

Figure 13B:
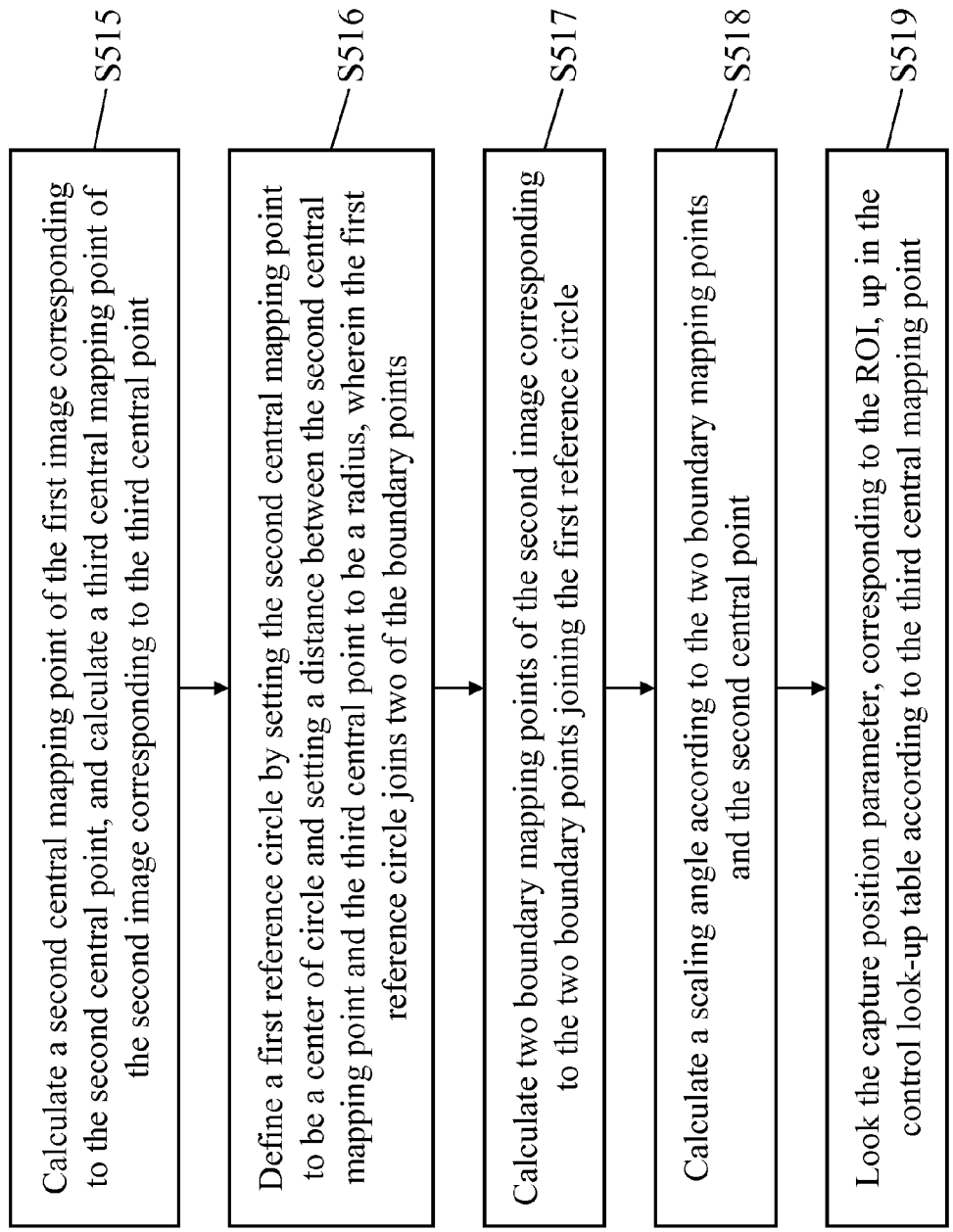
FIG. 13B is a flowchart of the step S510 in FIG. 12 according to an embodiment of the disclosure.

Furthermore, refer to FIG. 13B and FIG. 14, the detail of the step S510 and the boundary mapping points are illustrated according to another embodiment of the disclosure. In this embodiment, the ROI 60 is circular.

In step S510, the control unit 18 calculates a second central mapping point 42 of the first image 40 corresponding to the second central point 52, and calculates a third central mapping point 71 of the second image 50 corresponding to the third central point 61 (step S515). Similarly, the coordinate of the third central mapping point 71 and the coordinate of the second central mapping point 42 can be looked up in the control look-up table or further be obtained by using the interpolation method.

The control unit 18 can set the second central mapping point 42 to be a center of circle, and set a distance between the second central mapping point 42 and the third central point 61 to be a radius, so as to calculate and obtain a first reference circle 45. The first reference circle 45 joins two of the boundary points 62 (step S516), e.g. the boundary points 62a and 62b in FIG. 14.

Subsequently, the control unit 18 calculates and obtains the boundary mapping points 72a and 72b of the second image 50 corresponding to the boundary points 62a and 62b joining the first reference circle 45 (step S517), and calculates the scaling angle 56 according to the boundary mapping points 72a and 72b and the second central point 52 (step S518). The boundary mapping points 72a and 72b obtained in step S517 may differ from the boundary mapping points 72a and 72b obtained in step S512.

After the scaling angle 56 is obtained, the control unit 18 looks up the capture position parameter corresponding to the ROI 60, in the control look-up table according to the third central mapping point 71 (step S519). The capture position parameter includes a tilt coefficient and a pan coefficient. When calculating the scaling angle 56, the control unit 18 in this embodiment only utilizes the boundary points 62a and 62b joining the first reference circle 45, and the corresponding boundary mapping points 72a and 72b and does not need to calculate other boundary points 62 or other boundary mapping points 72. Thus, the disclosure may calculate and obtain the scaling angle 56 faster and meanwhile keep high accuracy.

In this way, according to the control look-up table established by the calibration unit 16 in advance and according to the ROI 60 defined by users, the control unit 18 can calculate and obtain the corresponding tilt coefficient and pan coefficient in a capture position parameter fast in real time, and then control the second camera 14 according to the capture position parameter, for obtaining the third image under the FOV corresponding to the ROI 60. Specifically, the FOV of the third image is similar to the ROI 60 but the third image has a higher resolution and more details than the ROI 60 in the first image 40.

Figure 16:
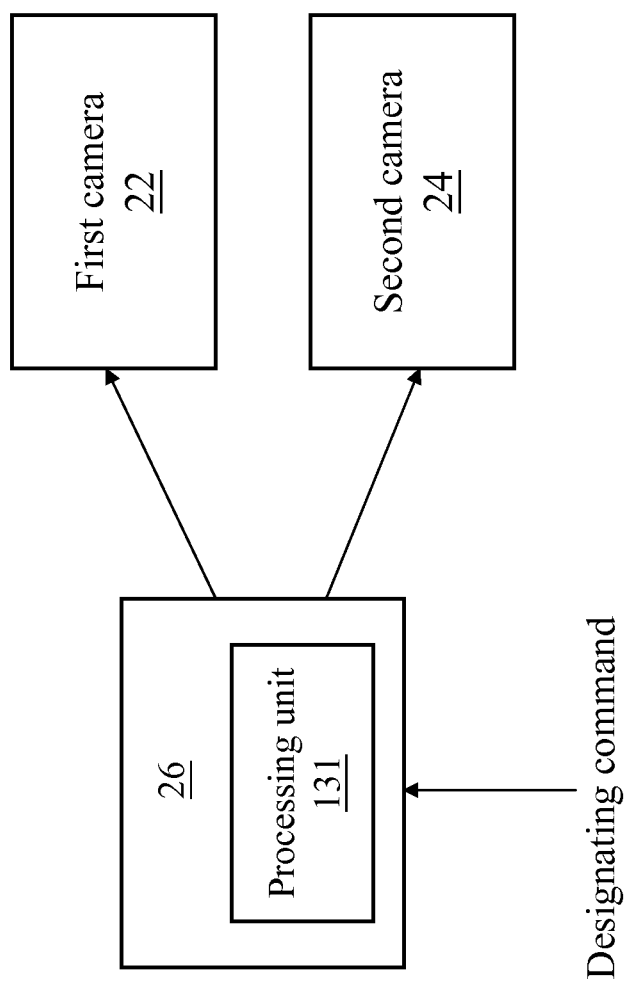
FIG. 16 is a schematic diagram of a linking-up photographing system according to an embodiment of the disclosure.

On the other hand, the disclosure further provides another embodiment of the linking-up photographing system. Refer to FIG. 16, the linking-up photographing system includes a first camera 22, a second camera 24 and a control module 26. The first camera 22 and the second camera 24 connect to the control module 26. The disposition, operation and type of the first camera 22 and of the second camera 24 are the same as the embodiment in FIG. 1 and are not described hereinafter thereby.

The control module 26 can be embodied by a personal computer, a network video recorder (NVR), an embedded system or an electronic device having a computing function in this and some embodiments. After the first camera 22 and the second camera 24 connect to the control module 26, the processing unit 131 performs a control method of linked-up cameras according to the first image and the second image which are equal to the first image and the second image obtained in FIG. 1. The differences between the linking-up photographing systems in FIG. 1 and FIG. 16 are that the control module 26 in FIG. 16 includes a processing unit 131 which can perform a link-up control procedure and even perform a motion detection procedure or an object detection procedure, and that the control module 26 rather directly calculates a capture position parameter according to a designating signal, the first image and the second image in real time than looks up the capture position parameter in a control look-up table, for controlling the second camera 24 to operate according to the capture position parameter.

Figure 17:
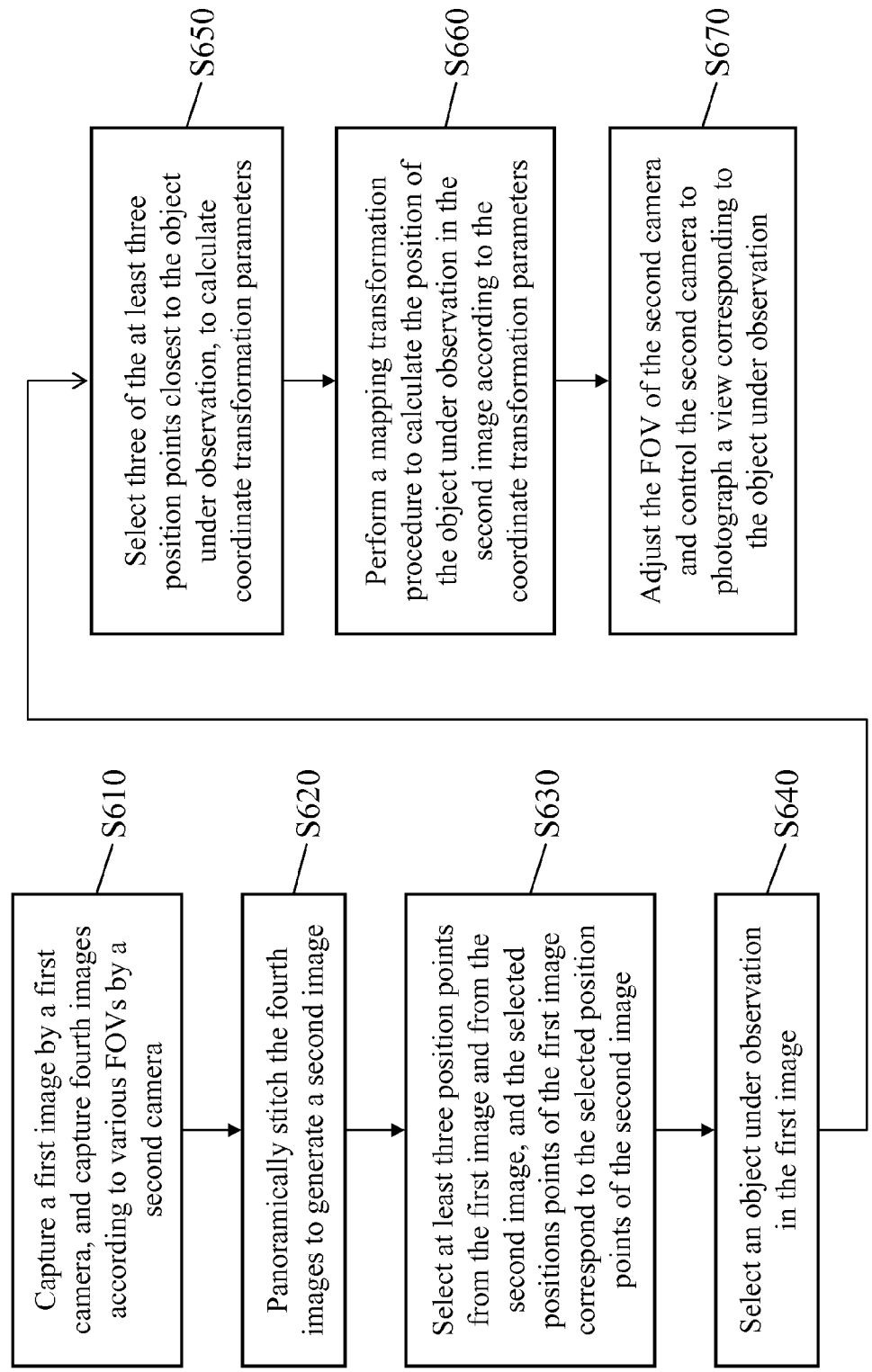
FIG. 17 is a flowchart of a control method of linked-up cameras according to an embodiment of the disclosure.

Refer to FIG. 16 and FIG. 17, the control method in the link-up control procedure performed by the linking-up photographing system includes the following steps. Firstly, the processing unit 131 controls the first camera 22 to capture the first image shown in FIG. 4A according to its FOV, and controls the second camera 24 to capture many fourth images shown in FIG. 4B according to various FOVs (step S610). The fourth images are planar and panoramically stitched to generate the second image shown in FIG. 2C (step S620).

Subsequently, at least three position points are set in the first image and in the second image (step S630), and the locations of the three position points in the first image correspond to the locations of the three position points in the second image respectively. Then, a desired object under observation, is set in the first image (step S640), three position points, which are the closest to the object under observation in the first image, are selected from the at least three position points to calculate a coordinate transformation parameter through which the first image can map onto the second image (step S650).

Finally, after a location, i.e. the capture position parameter, of the object under observation in the second image is calculated according to the coordinate transformation parameter (step S660); the FOV of the second camera 24 is adjusted to photograph the object under observation (step S670).

In this embodiment, the panoramic stitching can refer to the above description of FIG. 6A to FIG. 6K, the setting of position points in the first image and in the second image can refer to the above description of FIG. 8, the setting of the object under observation can refer to the description of FIG. 8, the selection of the three position points can refer to the description of FIG. 8 and FIG. 9, and the calculation of the location of the object under observation in the second image can refer to the description of equation (1), FIG. 14 and FIG. 15, whereby they will not be illustrated hereinafter.

Additionally, the control module in the disclosure can further include a storage unit, a first signal input unit, a second signal input unit, a signal output unit, a communication unit and a display unit all of which are not shown in the figures and connect to the processing unit. The storage unit can store the first image, the second image, the fourth images, the mapping transformation procedure, and the link-up control procedure, and can even further store the motion detection procedure or the object detection procedure. The storage unit is a random access memory (RAM), a flash memory or a hard disk. The first signal input unit connects to the first camera and the second camera, for receiving the first image, the second image and the fourth images. The types and quantity of connection ports of the first signal input unit can be designed according to various application requirements. The second signal input unit receives the designating command for selecting the desired object under observation. As above, in this and some embodiments, the designating command can be provided manually by observers or be provided automatically by performing a motion detection procedure or an object detection procedure, or be provided by an external computing device. The signal output unit connects to the second camera and sends a driving signal to the second camera for adjusting the FOV of the second camera. The signal output unit and the first signal input unit can be embodied in the same component or in two separate components. Similarly, the signal output unit and the second signal input unit can be embodied in the same component or in two separate components. The communication unit connects the linking-up photographing system to a network. The display unit can display the first image and the fourth images in real time. The linking-up photographing system can further connect to a server or terminal display device through the network.

As set forth above, the disclosure uses a fisheye camera, a panoramic camera or a wide-angle camera to capture a panoramic image, i.e. the above first image, and uses a PTZ camera to capture another panoramic image, i.e. the above second image, whose a FOV overlaps that of the first image. Then, the disclosure establishes the above control look-up table according to the mapping relation between these two panoramic images, and then obtains a desired capture position parameter according to the designating command fast by the look-up manner. By using the capture position parameter, the disclosure can perform the above control method to fast control many linked-up cameras to operate. Therefore, the disclosure may save great computing quantity caused by calculating the capture position parameter in real time. Moreover, the disclosure also uses the look-up manner to directly obtain the tilt coefficient and pan coefficient corresponding to the ROI and uses the first reference circle to fast calculate a scaling angle corresponding to the ROI. Thus, the disclosure can fast control many cameras to operate in linking-up manner, and reduce the response time which users have to wait.

What is claimed is:
1. A control method of linked-up cameras, comprising:
   acquiring a first image via a first camera;

acquiring a second image via a second camera, wherein a field of view (FOV) of the second image partially at least overlaps a FOV of the first image;

establishing a control look-up table according to the first image and the second image;

receiving a designating command which specifies a region of interest (ROI) in the first image; and adjusting a FOV of the second camera according to the ROI and the control look-up table, and then controlling the second camera to photograph a view specified by the ROI, to obtain a third image, wherein the step of adjusting the FOV of the second camera according to the ROI and the control look-up table, and then controlling the second camera to photograph a view specified by the ROI to obtain the third image comprises:

looking up a capture position parameter which corresponds to the ROI, in the control look-up table according to a third central point of the ROI; and controlling the second camera according to the capture position parameter, so as to obtain the third image;

wherein the second image comprises a second central point, the ROI comprises a plurality of boundary points, and the step of looking up the capture position parameter which corresponds to the ROI, in the control look-up table according to the third central point of the ROI comprises:

calculating a third central mapping point of the second image corresponding to the third central point, and calculating a plurality of boundary mapping points of the second image corresponding to the boundary points;

calculating a scaling angle according to the boundary mapping points, the second central point and the third central mapping point; and looking up the capture position parameter which corresponds to the ROI, in the control look-up table according to the third central mapping point, wherein the capture position parameter comprises a tilt coefficient and a pan coefficient; and wherein the step of calculating the scaling angle according to the boundary mapping points, the second central point and the third central mapping point comprises:

calculating a plurality of angles formed by the boundary mapping points, the second central point and the third central mapping point; and multiplying a maximum acute angle of the angles by 2 to obtain the scaling angle.

2. The control method of linked-up cameras according to claim 1, wherein the step of acquiring the second image from the second camera comprises:

capturing a plurality of fourth images according to various FOVs by the second camera; and stitching the fourth images to generate the second image which is panoramic.

3. The control method of linked-up cameras according to claim 1, wherein the first image includes a plurality of coordinate points, and the step of establishing the control look-up table according to the first image and the second image comprises:

setting M position points in the first image and in the second image, and the M position points of the first image corresponding to the M position points of the second image respectively, where M is a positive integer greater than or equal to 3;

grouping every three of the M position points of the first image together to generate permutations, and to generate N position point sets according to an order of all the permutations, where N is a positive integer;

calculating N coordinate transformation parameter sets which correspond to the N position point sets respectively;

performing a mapping transformation procedure on each coordinate point in the first image according to one of the N coordinate transformation parameter sets to obtain a capture position parameter corresponding to the coordinate point, for the second camera; and storing the capture position parameters in the control look-up table.

4. The control method of linked-up cameras according to claim 3, wherein the mapping transformation procedure performs the following steps on each coordinate point:

selecting one of the N position point sets according to current one of the coordinate points;

calculating a mapping point of the second image corresponding to the current coordinate point according to the coordinate transformation parameter set corresponding to the selected position point set; and obtaining the capture position parameter corresponding to the mapping point.

5. The control method of linked-up cameras according to claim 4, wherein the selected position point set has the three position points closest to the current coordinate point.

6. The control method of linked-up cameras according to claim 3, wherein the capture position parameter comprises a tilt coefficient and a pan coefficient for the second camera.

7. A linking-up photographing system, comprising:

a first camera configured to acquire a first image;

a second camera configured to acquire a second image presenting a FOV which partially at least overlaps a FOV of the first image;

a calibration processor configured to establish a control look-up table according to the first image and the second image; and a control processor configured to receive a designating command which specifies a ROI in the first image, and adjust a FOV of the second camera according to the ROI and the control look-up table, so as to control the second camera to photograph a view specified by the ROI, to obtain a third image, wherein the control processor looks up a capture position parameter corresponding to the ROI in the control look-up table according to a third central point of the ROI, and controls the second camera to obtain the third image according to the capture position parameter;

wherein the second image comprises a second central point, the ROI comprises a plurality of boundary points, and when looking up the capture position parameter corresponding to the ROI in the control look-up table according to the third central point of the ROI, the control processor performs the following steps:

calculating a third central mapping point of the second image corresponding to the third central point;

calculating a plurality of boundary mapping points of the second image corresponding to the boundary points;

calculating a scaling angle according to the boundary mapping points, the second central point and the third central mapping point; and looking up the capture position parameter corresponding to the ROI in the control look-up table according to the third central mapping point, wherein the capture position parameter comprises a tilt coefficient and a pan coefficient; and wherein when calculating the scaling angle according to the boundary points, the second central point and the third central mapping point, the control processor calculates a plurality of angles formed by the boundary mapping points, the second central point and the third central mapping point, and multiplies a maximum acute angle of the angles by 2 to obtain the scaling angle.

8. The linking-up photographing system according to claim 7, wherein the second camera captures a plurality of fourth images according to various FOVs, and the fourth images are stitched to generate the second image which is panoramic.

9. The linking-up photographing system according to claim 7, wherein the first image comprises a plurality of coordinate points, and when establishing the control look-up table according to the first image and the second image, the calibration processor performs the following steps:
  setting M position points in the first image and in the second image, wherein the M position points of the first image correspond to the M position points of the second image respectively, and M is a positive integer greater than or equal to 3;
  successively grouping every three of the M position points of the first image together to generate permutations, and to generate N position point sets according to an order of all the permutations, where N is a positive integer;
  calculating N coordinate transformation parameter sets corresponding to the N position point sets respectively;
  performing a mapping transformation procedure on each of the coordinate points of the first image according to one of the N coordinate transformation parameter sets to obtain a capture position parameter of the second camera corresponding to the coordinate point; and
  storing the capture position parameters in the control look-up table to establish the control look-up table.

10. The linking-up photographing system according to claim 9, wherein in the mapping transformation procedure, the control processor performs the following steps:
  selecting one of the N position point sets according to current one of the coordinate points;
  calculating a mapping point of the second image corresponding to the current coordinate point according to the coordinate transformation parameter set corresponding to the selected position point set; and
  calculating and obtaining the capture position parameter corresponding to the mapping point.

11. The linking-up photographing system according to claim 10, wherein the selected position point set comprises the three position points closest to the current coordinate point.

12. The linking-up photographing system according to claim 9, wherein the capture position parameter comprises a tilt coefficient and a pan coefficient for the second camera.

13. A control method of linked-up cameras, comprising:
  acquiring a first image via a first camera;
  acquiring a second image via a second camera, wherein a field of view (FOV) of the second image partially at least overlaps a FOV of the first image;
  establishing a control look-up table according to the first image and the second image;
  receiving a designating command which specifies a region of interest (ROI) in the first image; and
  adjusting a FOV of the second camera according to the ROI and the control look-up table, and then controlling the second camera to photograph a view specified by the ROI, to obtain a third image,
wherein the ROI is circular and has a plurality of boundary points, the second image has a second central point, and the step of looking up the capture position parameter which corresponds to the ROI, in the control look-up table according to the third central point of the ROI comprises:
  calculating a second central mapping point of the first image corresponding to the second central point, and calculating a third central mapping point of the second image corresponding to the third central point;
  defining a first reference circle by setting the second central mapping point to be a center of circle and setting a distance between the second central mapping point and the third central point to be a radius, wherein the first reference circle joins two of the boundary points;
  calculating two boundary mapping points of the second image corresponding to the two boundary points joining the first reference circle;
  calculating a scaling angle according to the two boundary mapping points, the second central point and the third central mapping point; and
  looking up the capture position parameter which corresponds to the ROI, in the control look-up table according to the third central mapping point, wherein the capture position parameter comprises a tilt coefficient and a pan coefficient; and
wherein the step of calculating the scaling angle according to the two boundary mapping points, the second central point and the third central mapping point comprises:
  calculating a plurality of angles formed by the two boundary mapping points, the second central point and the third central mapping point; and
  multiplying a maximum acute angle of the angles by 2 to obtain the scaling angle.

14. A linking-up photographing system, comprising:
  a first camera configured to acquire a first image;
  a second camera configured to acquire a second image presenting a FOV which partially at least overlaps a FOV of the first image;
  a calibration processor configured to establish a control look-up table according to the first image and the second image; and
  a control processor configured to receive a designating command which specifies a ROI in the first image, and adjust a FOV of the second camera according to the ROI and the control look-up table, so as to control the second camera to photograph a view specified by the ROI, to obtain a third image,
wherein the ROI is circular and comprises a plurality of boundary points, the second image comprises a second central point, and when looking up the capture position parameter corresponding to the ROI in the control look-up table according to the third central mapping point, the control processor performs the following steps:
  calculating a second central mapping point of the first image corresponding to the second central point;
  calculating a third central mapping point of the second image corresponding to the third central point;
  defining a first reference circle by setting the second central mapping point to be a center of circle, and by setting a distance between the second central mapping point and the third central point to be a radius, wherein the first reference circle joins two of the boundary points;

calculating two boundary mapping points of the second image corresponding to the two boundary points joining the first reference circle;

calculating a scaling angle according to the two boundary mapping points, the second central point and the third central mapping point; and looking up the capture position parameter corresponding to the ROI in the control look-up table according to the third central mapping point, wherein the capture position parameter comprises a tilt coefficient and a pan coefficient; and wherein when calculating the scaling angle according to the two boundary points, the second central point and the third central mapping point, the control processor calculates a plurality of angles formed by the two boundary mapping points, the second central point and the third central mapping point, and multiplies a maximum acute angle of the angles by 2 to obtain the scaling angle.

* * * * *